Jan. 6, 1948.  H. T. TORNBERG  2,433,937
MACHINE FOR MAKING SHEETS OF EXTRUDED PLASTICS
Filed Oct. 25, 1945  2 Sheets-Sheet 1

INVENTOR
HENNING T. TORNBERG
BY
ATTORNEY

Patented Jan. 6, 1948

2,433,937

UNITED STATES PATENT OFFICE 2,433,937

MACHINE FOR MAKING SHEETS OF EXTRUDED PLASTICS

Henning T. Tornberg, Ridgewood, N. J., assignor to Modern Plastic Machinery Corporation, Wilmington, Del., a corporation of Delaware Application October 25, 1945, Serial No. 624,384

8 Claims. (Cl. 18—14)

The present invention relates to plastic extrusion machines of the type for extruding a tube, slitting the tube as it is extruded and then flattening out the slit stock as sheet material.

In machines of this character, the tube being extruded from the die is of comparatively small diameter and in a soft state. It is then drawn over a member called a seal which is of comparatively large diameter positioned below the die, and is caused to expand to the diameter of said seal by means of air introduced under pressure into the extruded tube through a nozzle in the die. For the compressed air to do its work, an effective air seal should be maintained between said seal member and the tube's interior. It may be here noted, that at a point just below the seal, the tube is slit and then is spread by means of a system of rollers which also function to pull the web thus formed of the material extruded.

The principal object of this invention is to provide in machines of this class, a seal of the character mentioned, of novel and improved construction.

Another object hereof, is to provide a sealing device of the nature set forth, of novel and improved construction, which is adjustable for tubes expanded to different diameters so that the resulting web formed of the extruded material, be of different widths as may be required.

Another object of this invention is to provide a sealing means of the nature set forth, of novel and improved construction and having a novel mode of operation, which is easy to use, adjust and maintain and which is efficient in carrying out the purposes for which it is designed.

Other objects and advantages will become manifest as this disclosure proceeds.

In the accompanying drawings forming part of this application, similar characters of reference indicate corresponding parts in all the views.

Figure 1:
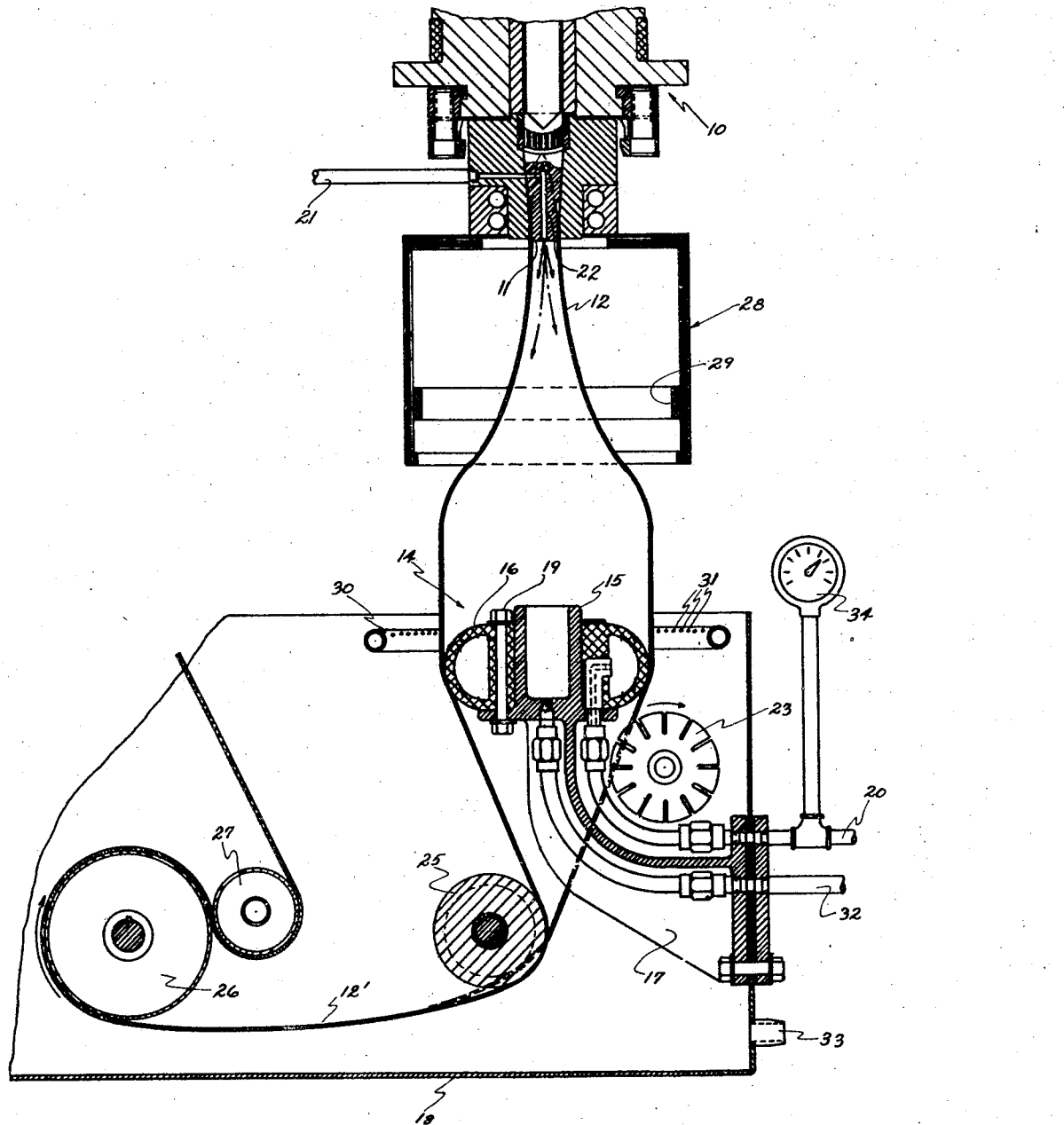
Fig. 1 is a diagrammatic central sectional view of a plastic extruder embodying the teachings of this invention.
Figure 2:
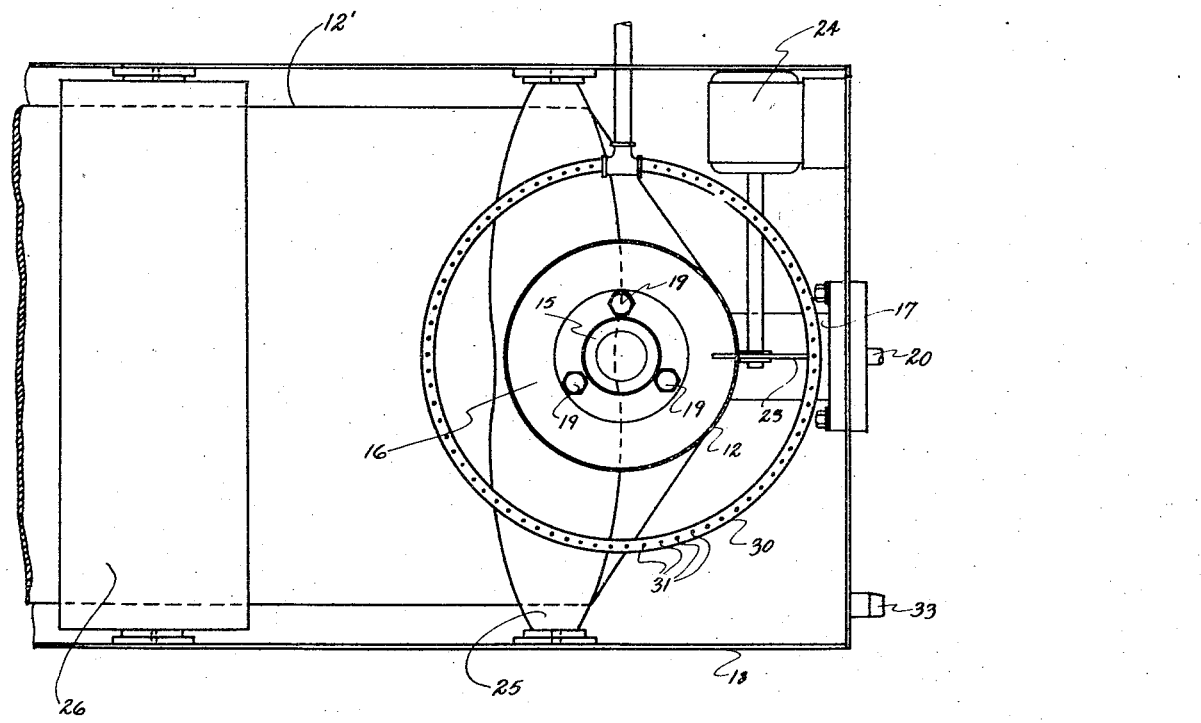
Fig. 2 is a plan view thereof.

In the drawings, the numeral 10 indicates generally a plastic extrusion machine having a die 11, adapted for the extrusion of a plastic mass in tubular form 12, which is made to extend over and house in its interior a seal device designated generally by the numeral 14. Said sealing device includes a cylindrical open top receptacle 15, about the body of which is mounted an expandable ring tube 16, which may be of rubber or other stretchable material, and endless preferably. Said receptacle 15, is atop a bracket 17 mounted on the wall of a tank 18. The ring tube 16 is positioned in a horizontal position, resting on and secured to said bracket, by means of the bolts 19. The central hole of the ring tube 16 is preferably cylindrical to fit in surface contact about the receptacle 15, while the peripheral surface of said ring tube is convex. Through a pipe 20 communicative with the interior of the ring tube 16, water or air under pressure may be introduced to inflate said ring tube to a predetermined diameter peripherally and maintain same so.

Through a pipe 21, communicative with a passage 22 in the die 11, which opens into the extruded tube 12, a medium under pressure, as air or water heated sufficiently may be introduced into said extruded tube, whereby said tube is caused to expand to the peripheral cross section of the ring tube 16. The numeral 23, indicates a rotary saw driven by a motor 24, and is adapted to slit the wall of the extruded tube 12, longitudinally. After the extruded tube is so slit, it is flattened into a single ply web, by being passed over an idler roller 25, and thence between the pair of rollers 26 and 27, which pull the web 12' away from the extrusion machine 10, to be rolled up, or otherwise dealt with.

Usually compressed air is introduced through pipe 21, to effect the expansion of the tube of extruded material. It is preferable to include a hood 28 about the extruded material between the die 11 and the sealing device 14, to maintain the material is plastic condition by means from a heating coil 29. In the region of the seal 14, encircling the exterior of the tube of extruded material, a spray tube 30 is positioned, from the apertures 31 of which water is sprayed directly onto the expanded tube of extruded material, to effect the cooling of same to a degree convenient for its further handling by the machines.

To provide a proficient and effective seal between the ring tube 16 and the extruded tube 14, so that the medium introduced to inflate and expand the extruded tube 12 to ring tube peripheral size shall do its work, water under pressure is introduced through pipe 32, to fill and overflow the receptacle 15, and cover the ring tube 16. The mouth of the receptacle 15, is therefore preferably made to be a little above the ring tube 16. Any water passing the ring tube 16, and the water sprayed from spray tube 30, will collect in tank 18 and be drained off through 33.

Although not shown in the drawings, proper pressure indicators or gauges as 34, may be interposed in each of the pipe lines 20, 21 and 32. It is evident that the peripheral diameter of the ring tube 16 is adjustable for maintaining an effective water seal between the extruded tube 12 and the said ring tube 16 and that initial adjustment of the ring tube peripheral diameter will determine the diametral expansion of the tubular form extruded from the die 11 and hence the width of web 12' produced by the machine. It may here be noted that the tube 12 issues from the die 11, downwardly, and it is advisable that the ring tube 16 and the said die 11, be in axial alignment; that the slitting blade 23 shall be immediately below the seal 14, and that the idler 25, be sufficiently below the slitting blade to assure proper flattening out of the extruded material into a web of sheet material.

This invention is capable of various forms of numerous applications without departing from the essential features herein disclosed. It is therefore intended and desired that the particular description herein be deemed illustrative and not restrictive and that the patent shall cover all patentable novelty herein set forth; reference being had to the following claims rather than to the specific embodiment herein to indicate the scope of this invention.

I claim:

1. In a plastic extrusion machine, the combination of a die adapted for the extrusion of a plastic mass in the form of a tube of comparatively small peripheral cross section, a ring-shaped tube of comparatively large peripheral cross section and of stretchable material, mounted near the die and in the path of the tube being extruded; the line of said path intersecting the plane of said large cross section and said ring tube being adapted to receive the extruded tube over it whereby said ring tube is positioned within the interior of the extruded tube and in peripheral contact therewith, and means for admitting a supply of medium under pressure into the ring tube whereby it may assume different peripheral cross-sectional sizes.

2. A combination as defined in claim 1, wherein the die is adapted for the extrusion of a tube of circular cross section and wherein the ring tube is of circular peripheral cross section.

3. A combination as defined in claim 1, wherein the ring tube is endless.

4. In a plastic extrusion machine the combination of a die adapted for the downward extrusion of a plastic mass in the form of a tube of comparatively small peripheral cross section, a frame positioned below the die, a seal comprising a ring-shaped tube of comparatively large peripheral cross section and of stretchable material, mounted horizontally on said frame below the die, adapted to receive the extruded tube over it whereby said ring tube is positioned within the interior of the extruded tube and in peripheral contact therewith, a slitting means positioned below the ring tube, adapted to slit the wall of the extruded tube longitudinally, means to flatten the slit tube into a web, comprising rollers adapted to draw the material of the slit extruded tube in a single ply; said die having an opening communicative with the interior of the extruded tube, adapted to receive a supply of medium under pressure for introduction therefrom into the extruded tube above the ring tube, whereby the extruded tube issuing from the die is expanded to the peripheral cross section of the ring tube, and means for admitting a supply of medium under pressure into the ring tube whereby it may assume different peripheral cross-sectional sizes.

5. A combination as defined in claim 4, wherein the die is adapted for the extrusion of a tube of circular cross section and wherein the ring tube is of circular peripheral cross section.

6. A combination as defined in claim 4, wherein the ring tube is endless.

7. A combination as defined in claim 4, including means positioned through the hole in the ring tube, adapted to receive a liquid for introduction into the extruded tube immediately above the ring tube, whereby said liquid will cover the ring tube and will seal the space between the ring and extruded tubes.

8. A combination as defined in claim 4, wherein the hole of the ring tube is cylindrical and the perimetral surface of said ring tube is substantially convex with respect to the vertical, and including an upright cylindrical member mounted atop the frame; the ring tube being concentrically mounted on said cylindrical member and in contact relation thereof; said cylindrical member extending above the ring tube and being adapted for the passage of a liquid therethrough for introduction into the extruded tube, whereby said liquid will cover the ring tube and will seal the space between the ring and extruded tubes.

HENNING T. TORNBERG.

REFERENCES CITED

The following references are of record in the file of this patent:

UNITED STATES PATENTS

| Number | Name | Date |
| --- | --- | --- |
| 2,257,222 | Bergmann | Sept. 30, 1941 |